United States Patent [19]

Sakurai

[11] Patent Number: 4,825,384
[45] Date of Patent: Apr. 25, 1989

[54] SPEECH RECOGNIZER

[75] Inventor: Atsushi Sakurai, Yokohama, Japan

[73] Assignee: Canon Kabushiki Kaisha, Tokyo, Japan

[21] Appl. No.: 48,503

[22] Filed: May 11, 1987

Related U.S. Application Data

[63] Continuation of Ser. No. 408,594, Aug. 16, 1982, abandoned.

[30] Foreign Application Priority Data

Aug. 27, 1981 [JP] Japan ................... 56-134766

[51] Int. Cl.⁴ .............................................. G10L 5/00
[52] U.S. Cl. ................................ 364/513.5; 381/47; 381/43; 381/51; 381/41
[58] Field of Search ................. 381/43, 47, 94, 51; 179/81 B

[56] References Cited

U.S. PATENT DOCUMENTS

| 3,662,108 | 5/1972 | Flanagan | 381/47 |
| 3,784,747 | 1/1974 | Berkley et al. | 179/81 B |
| 3,786,188 | 1/1974 | Allen | 381/47 |
| 4,225,754 | 9/1980 | Bernard et al. | 179/81 B |
| 4,348,550 | 9/1982 | Pirz et al. | 381/43 |
| 4,385,359 | 5/1983 | Watari et al. | 381/43 |
| 4,417,098 | 11/1983 | Chaplin et al. | 381/43 |
| 4,459,674 | 7/1984 | Sakurai | 381/51 |

Primary Examiner—Emanuel S. Kemeny
Attorney, Agent, or Firm—Fitzpatrick, Cella, Harper & Scinto

[57] ABSTRACT

A voice subtractor/recognizer which prevents interference from a voice output device by inputting via one input device both a sound to be recognized and any sound being output by the output device, and inputting at a second input device a signal representing the output of the output device. The latter signal is analyzed, and the result is used to inversely filter a signal representing the sounds input via the first-mentioned input device.

8 Claims, 1 Drawing Sheet

SPEECH RECOGNIZER

This application is a continuation of application Ser. No. 408,594 filed 8/16/82, now abandoned.

BACKGROUND OF THE INVENTION

The present invention relates to a speech recognizer. With recent advances in speech recognition techniques, a speech recognizer is used which analyzes a voice input through an input means such as a microphone and which then supplies the analysis result to other control equipment as control information. If the control equipment itself has a voice generating function with a loudspeaker or the like, when the control equipment is operated by an instruction provided in the form of speech by the operator, the voice of the operator and the synthesized voice generated by the control equipment are simultaneously input to the input means, resulting in degradation of the speech recognition rate.

SUMMARY OF THE INVENTION

The present invention has been made in view of this and has for its object to provide a speech recognizer which is capable of recognizing only the voice of the operator even if the voice of the operator and that of the equipment are simultaneously input thereto.

It is another object of the present invention to provide a speech recognizer which, when the voice of the operator and that of the equipment are simultaneously input, is capable of extracting the voice of the operator therefrom from among the input voices by monitoring the synthesized voice of the equipment and mixing the inverted signal thereof with the mixed input.

In order to achieve the above objects, there is provided according to the present invention a voice recognizer wherein an auxiliary voice signal input terminal is incorporated in addition to a recognition voice signal input terminal, a synthesized voice signal from a voice generation circuit of a control circuit is input to the auxiliary voice signal input terminal to perform parameter analysis to prepare the signal for use in inverse filtering of the other primary voice signal, and the input voice signal supplied to the recognition voice signal input terminal is filtered using a particular parameter to erase from the input voice signal the synthesized voice from the control circuit.

It is still another object of the present invention to provide a voice recognizer comprising:

first input means for receiving a first voice;

second input means for receiving a second voice from a sound source other than the first voice, which is also received by said first input means;

means, connected to said first and second input means, for filtering the second voice from said sound source other than the first voice from voice information including both the first voice and the second voice from said sound source which is received by said first input means by means of the second voice from said sound source which is received by said second input means; and means for recognizing the voice information received through said filter means.

The above and other objects and features of the present invention will become apparent from the following description when taken in conjunction with the accompanying drawings.

DETAILED DESCRIPTION OF THE PREFERRED EMBODIMENTS

The preferred embodiment of the present invention will now be described with reference to the accompanying drawings.

Figure 1:
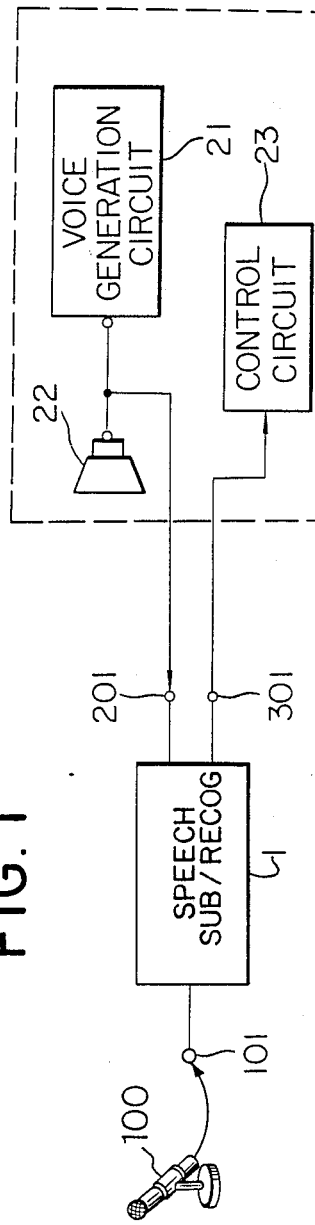
FIG. 1 is a block diagram of a voice recognizer and control equipment according to the present invention.
Figure 2:
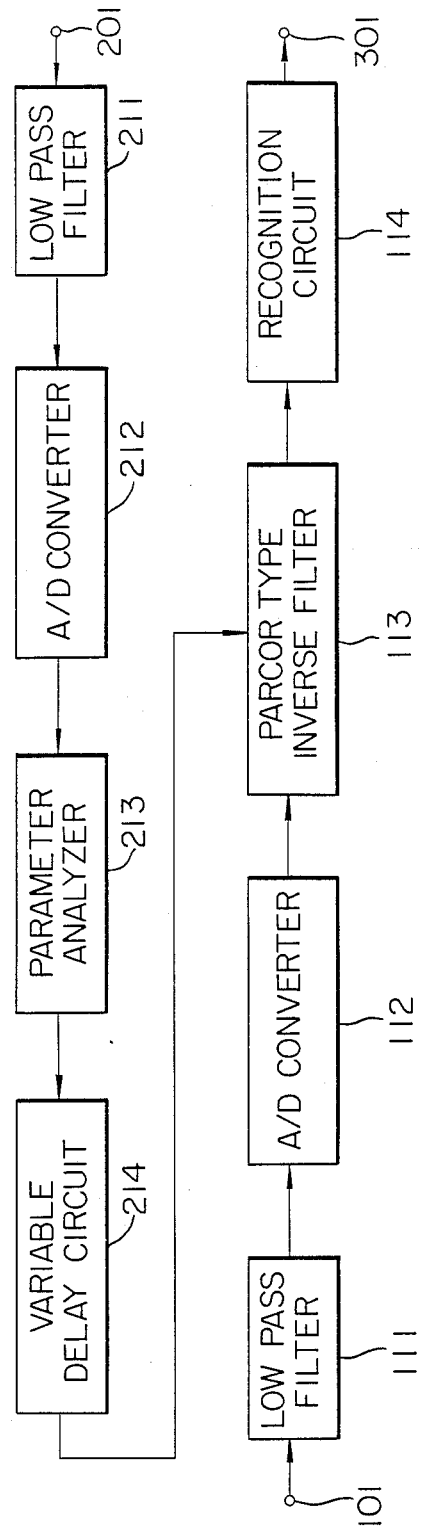
FIG. 2 is a block diagram of the voice recognizer.

A speech subractor/recognizer 1 shown in FIG. 1 and FIG. 2 has a low pass filter 111, an A/D converter 112, a PARCOR type inverse filter 113, a recognition circuit 114, a low pass filter 211, an A/D converter 212, a parameter analyzer 213, and a variable delay circuit 214. Control and voice output equipment 2 shown in FIG. 1 has a voice generation citcuit 21, a voice generator 22, a control circuit 23, and so on.

The mode of operation of the speech recognizer having the parts described above will now be described.

Assume that a synthesized voice is generated by the control equipment 2. The synthesized voice is generated by the voice generation circuit 211 through the voice generator 22. When an instruction is supplied by a voice to a voice input means such as a microphone 100 during the output period of the synthesized voice described above, the synthesized voice from the voice generator 22 is also input through the microphone 100. Therefore, recognition voice signal input terminal 101 of the speech recognizer 1 receives two signals, that is, the synthesized voice and the voice of the operator. The two signals received at the input terminal 101 are supplied to the A/D converter 112 to be digitized thereby.

Since the digital signal from the A/D converter 112 includes the synthesized voice from the voice generator 22 of the control equipment 2 shown in FIG. 1, it must not be directly subjected to speech recognition. The following operation is performed so as to remove the synthesized voice from the input signal.

The output voice from the voice generation circuit 21 of the control equipment 2 is suppled to an auxiliary voice signal input terminal 201 of the voice recognizer 1. The voice signal is then filtered for its high frequency components through the low pass filter 21 and is dignitized by the A/D converter 212. The digital signal from the A/D converter 212 is subjected to parameter analysis with suitable periods by the parameter analyzer 213. The parameter extracted by the parameter analyzer 213 is delayed for a suitable time duration by the variable delay circuit 214 and is then supplied to one input terminal of the PARCOR type inverse filter 113.

The voice signal to be recognized, which has been digitized by A/D converter 112, is supplied to the other input terminal of the PARCOR type inverse filter 113. The signal from the voice generator 21 is removed or extracted by the PARCOR type inverse filter 113 and is thus absent from the output thereof.

Therefore, the output signal from the PARCOR type inverse filter 113 is a signal which corresponds only to the voice of the operator. The output signal from the PARCOR type inverse filter 113 is suppiled to the recognition circuit 114 and is supplied to the control equipment 2 through an output terminal 301. The voice of the operator is thus recognized correctly.

In summary, according to the present invention, even if the control and voice output equipment of the voice recognizer has a voice generating function and is generating a voice, the operator voice recognition result is not adversely affected thereby.

The PARCOR method is used in the embodiment described above. However, the present invention is not limited to this. Any analysis method may be used as long as it utilizes the feature parameters representing a voice.

What I claim is:

1. A system comprising a voice recognizer and an apparatus controlled by said voice recognizer comprising:

signal generation means for generating a voice signal;
conversion means for converting an output of said signal generating means to an output sound;
the voice recognizer comprising:
(a) acoustic input means for receiving output sound from said conversion means and a voice containing voice information;
(b) second input means connected to said signal generation means, for receiving said voice signal;
(c) means connected to said acoustic input means and to said second input means for filtering said output sound from the voice and output sound received by said acoustic input means, said filtering means performing said filtering in accordance with said voice signal received by said second input means, said filtering means thereby producing a filtered signal containing the voice information target via said acoustic input means;
(d) means connected to said filtering means for recognizing the voice information received through said filtering means, to produce a result of voice recognition; and
(e) control means provided in said apparatus responsive to said result of voice recognition.

2. A voice recognizer according to claim 1, wherein said conversion means comprises a loudspeaker.

3. A voice recognizer according to claim 1, wherein said second input means comprises delay means for delaying said voice signal.

4. A voice recognizer according to claim 1, wherein said filtering means comprises an inverse filter.

5. A voice recognizer according to claim 1, wherein said acoustic input means includes a microphone.

6. A control equipment using a voice recognizer comprising:

voice generation means for generating an analog synthesized voice signal;
output means for outputting said synthesized voice signal as a sound;
acoustic input means for entering sound including a voice to be recognized;
first conversion means connected to said acoustic input means for analog-digital conversion of said voice entered by said acoustic input means to produce a digital sound signal;
second conversion means connected to said voice generation means, for analog-digital conversion of said analog synthesized voice signal;
delay means for delaying the output of said second conversion means;
filter means connected to said delay means for receiving said synthesized voice signal from said delay means and for filtering said synthesized voice signal from said digital sound signal entered via first conversion means, said digital sound signal including both said voice to be recognized and sound output by said output means;
means connected to said filter means for recognizing said filter synthesized voice, and producing a result of voice recognition; and
a device responsive to said result of the voice recognition.

7. Control equipment according to claim 6, wherein said output means comprises a loudspeaker.

8. Control equipment according to claim 6, wherein said acoustic input means comprises a microphone.

* * * * *

UNITED STATES PATENT AND TRADEMARK OFFICE
CERTIFICATE OF CORRECTION

PATENT NO. : 4,825,384
DATED : April 25, 1989
INVENTOR(S) : ATSUSHI SAKURAI

It is certified that error appears in the above-identified patent and that said Letters Patent is hereby corrected as shown below:

COLUMN 1
    Line 32, delete "therefrom".

COLUMN 2

Line 25, change "voice generation circuit 211" to --voice generation circuit 21--.
    Line 43, change "suppled" to --supplied--.
    Line 46 change "low pass filter 21" to --low pass filter 211--; and change "dignit-" to --digit--.

COLUMN 3
Line 31, change "target" to --input--.

Signed and Sealed this

Tenth Day of July, 1990

Attest:

HARRY F. MANBECK, JR.

*Attesting Officer*      *Commissioner of Patents and Trademarks*